United States Patent [19]

Hahn et al.

[11] 4,321,957
[45] Mar. 30, 1982

[54] BEAD CONSTRUCTION FOR TUBELESS TIRES

[75] Inventors: Friedrich W. Hahn, Nachrodt-Wilblingwerde; Dieter Meyer, Hemer, both of Fed. Rep. of Germany

[73] Assignee: Hahn GmbH & Co., Nachrodt, Fed. Rep. of Germany

[21] Appl. No.: 193,082

[22] Filed: Oct. 2, 1980

[30] Foreign Application Priority Data

Oct. 4, 1979 [DE] Fed. Rep. of Germany ....... 2940221

[51] Int. Cl.³ .................. B60C 15/04; B29H 17/32
[52] U.S. Cl. .......................... 152/362 R; 152/391; 156/136; 245/1.5
[58] Field of Search ............ 152/362 R, 362 CS, 391; 156/136; 245/1.5

[56] References Cited

U.S. PATENT DOCUMENTS

| 1,503,883 | 8/1924 | Cobb | 152/362 R |
| 2,874,747 | 2/1959 | Woodall | 152/362 R |

FOREIGN PATENT DOCUMENTS

| 2027274 | 12/1970 | Fed. Rep. of Germany ... 152/362 R |
| 2648914 | 5/1978 | Fed. Rep. of Germany ...... 152/362 |
| 2810847 | 9/1978 | Fed. Rep. of Germany . |
| 2820191 | 11/1978 | Fed. Rep. of Germany . |
| 1281439 | 12/1961 | France . |
| 1042861 | 9/1966 | United Kingdom ................ 152/362 |

*Primary Examiner*—Edward C. Kimlin
*Assistant Examiner*—Lois E. Boland
*Attorney, Agent, or Firm*—Karl F. Ross

[57] ABSTRACT

A tire-bead structure for a tubeless tire, especially for trucks and other heavy vehicles, having a steep-shoulder felly on the wheel which can be inclined outwardly at an angle of about 15° to the horizontal, comprises a bead core made up of a plurality of concentric turns of steel band or strip in nesting relationship and bent in an outwardly concave pattern so that at least an axially inward portion of each turn or strip lies at an angle to a radially outward portion thereof.

8 Claims, 10 Drawing Figures

BEAD CONSTRUCTION FOR TUBELESS TIRES

FIELD OF THE INVENTION

Our present invention relates to pneumatic tires for automotive vehicles, especially heavy duty tires for trucks and the like, and, more particularly, to a bead construction for such tubeless tires adapted to be mounted on so-called steep-shoulder rims, i.e. truck-wheel rims in which the bead rests against a felly which lies at an angle of about 15° to the axis and to the horizontal.

BACKGROUND OF THE INVENTION

Wheels or rims for truck tires and like heavy duty pneumatic tubeless tires can be of the so-called steep-shoulder type wherein the outer surface of the felly against which the inner edges of the beads of the tire rest are frustoconical with an apex angle of about 30°. This means that at any point along the felly, this surface includes an angle of about 15° with the axis or with a line parallel to the axis, i.e. a horizontal. The outer flange of the rim may include a slight angle with the vertical and rises at an obtuse angle from the aforementioned surface of the felly to flank the bead.

It is known to provide pneumatic tires for such wheels (see French Pat. No. 1,281,439) in which the tire bead has a core which is formed in part by a plurality of layers of steel strip or band, the ends of the layers being fixed by spot welding or adhesive binding which also prevents relative shifting of the layers.

The bead core formed in this manner serves to improve the anchoring of the carcass reinforcement, e.g. the steel bands or cords which pass beneath and around the bead core, thereby stabilizing the tire.

In spite of the attempts made to prevent relative shifting of the layers in this earlier system, some shifting can occur and various expedients have been proposed to limit the possibility of shifting. These techniques include winding a further band around the stack or otherwise tying the bands together.

This has been found to be impractical, time-consuming and expensive from a manufacturing point of view and also has the disadvantage that any devices used to hold the layers in place tends to excessively space the steel belts or, more generally, the carcass reinforcement from the bead core and reduce the stability of the tire.

Furthermore, since the tie means are generally wound helically around the layers of the bead core, some of the steel cords can be closer to the core than others and as a result the carcass reinforcement is not of uniform tension throughout, thereby leading to distortion, early tire wear, and to weak points at which rupture may occur.

When the tire is fully built using the teachings of the prior art, it frequently is out of round in places and the large scale production of tires seldom is able to produce two substantially identical tires because of these problems. Thus fabrication of the tires is not consistent.

Finally, experience has shown that in the conventional approach the steel belts (carcass reinforcement) frequently encounters sharp edges of the bead core so that with time the belts are damaged, tire wear is increased and the danger of blowout is heightened.

OBJECTS OF THE INVENTION

It is the principal object of the present invention to provide an improved tubeless pneumatic tire for automotive vehicles, especially trucks using steep-shoulder rims, whereby the disadvantages of prior art tires are avoided.

Another object of this invention is to provide an improved tire bead structure which precludes damage to steel belts or other carcass reinforcement by the bead core.

Still another object of our invention is to provide an improved bead structure for automotive vehicle tire which ensures uniform stress on the carcass reinforcement, eliminates shifting of members of the bead core and which enables the life of the tire and its reliability to be significantly increased.

A still further object of the invention is to provide a bead structure for a tire of the type described which eliminates imbalance and non-uniformity at low cost and without complicating fabrication of the tire.

SUMMARY OF THE INVENTION

These objects and others which will become apparent hereinafter are attained, in accordance with the present invention, in a bead structure for a pneumatic tire whose beads rest upon a felly of a steep-shoulder rim including an angle of about 15° to the axis and resting against respective flanges, the bead structure comprising a bead core made up of a plurality of layers of steel strip which are bent transversely so as to provide a concavity whereby successively outer (radially) layers are respectively nested in inner layers.

More specifically, at least the axially inwardly located portions of each strip are bent to form an angle with the remainder of the strip in the radial direction, thereby providing the aforementioned concavity. Each layer, in addition, can be endless or can have its ends welded to adjacent layers by spot welding with the junction between the ends being offset around the axis.

By the transverse profiling of the steel strips forming the layers or of the band or strip before coiling the layers or winding the strip to form the layers, we are able to completely exclude transverse shifting, i.e. shifting transverse to the direction in which the band runs or parallel to the axis of the wheel. According to the invention, the band or strip is so profiled and the layers are coiled, wound or bent so that at least the outer portion of each layer is bent frustoconically to include an angle of 15° with the horizontal and naturally with the axis of the wheel. When the core is placed in the bead, therefore, this axially outer portion of each layer will lie generally parallel to the felly surface engaged by the bead. The layers are thus able to shift only if they can expand which, in the assembly of the invention is practically impossible. Inward shifting is completely precluded by the radially outwardly bent axially inner parts.

It should be apparent that any additional means for tying the layers together or clamping them relative to one another are eliminated and hence the contributions of such parts to imbalance and non-uniformity characterizing earlier systems is excluded in the arrangement of the present invention.

The ends of the layers are spot welded together or the adjacent layers are connected thereto by adhesive bonding with no overlap or only a minimum overlap so that the junctions do not contribute to imbalance.

According to a feature of the invention, the carcass reinforcement (generally steel belts) is looped below the bead core of the invention in a completely uniform pattern and one which does not encounter sharp edges because of the bent configuration of the layers. Any stress upon the steel cord fibers of the carcass reinforcement is thus completely uniform.

The contoured shape of the steel bands in their stacked arrangement or even in an arrangement using only a single profiled steel band layer, is torsionally stable, i.e. highly resistant to torque about an axis perpendicular to the cross section of the core.

Since the bead core ring is practically free from imbalance, it is not necessary to be concerned for the location of the joints between ends during tire manufacture and hence time-consuming activities of this nature are eliminated and the production rate improved.

The tire bead structure of the invention also simplifies and facilitates mounting of the tire on the felly because the inclination of the core enables the bead to be pushed over the felly flange with ease while the stiffness of the core causes the bead to jump into the felly bed as soon as slightly more than half of the bead has been pried over the flange.

The two portions of the steel strip of each layer can be angularly bent relative to one another, i.e. the bend can be fairly sharp so that the cross-sectional profile is generally of L-shape. The ratio of the length of the foot of the L to the shank thereof should be between 1:1 and 1:4, preferably around 1:4, the base or foot lying axially inwardly.

When the foot and the shank include an obtuse angle, preferably between 120° and 135°, between them, successive layers nest in one another with substantially no spacing between the overlying and underlying feet or shanks and the only gaps being a slight spacing at the vertices.

The proper selection of the obtuse angle, the outer edges of the layers can be staggered so that they lie along of surface which is parallel to the inner surface of the felly flange.

The preferred obtuse angle is 130°.

To avoid a sharp vertex, the bend between the leg and the shank can be rounded, thereby imparting a J-shape to the strip.

We have found, in addition, that best results are obtained when the thickness of the steel strip or band is about 1 mm and the layers are cut from a coil of the band having a width before bending to the desired profile of about 20 mm. The axially outermost edges may also be bent in the same direction as the legs to provide a more well defined concavity if desired.

The layers can be prepared and formed into a core ring which can be coated with an adhesive and the core ring, consisting of one or more layers can also be provided in its concavity with at least one further bead-forming member, e.g. a steel cord enclosed steel band.

BRIEF DESCRIPTION OF THE DRAWING

The above and other objects, features and advantages of the present invention will become more readily apparent from the following description, reference being made to the accompanying drawing in which:

FIGS. 3 through 8, drawn in the scale of FIG. 1, show various embodiments of the core ring of the invention in transverse section;

SPECIFIC DESCRIPTION

Figure 1:
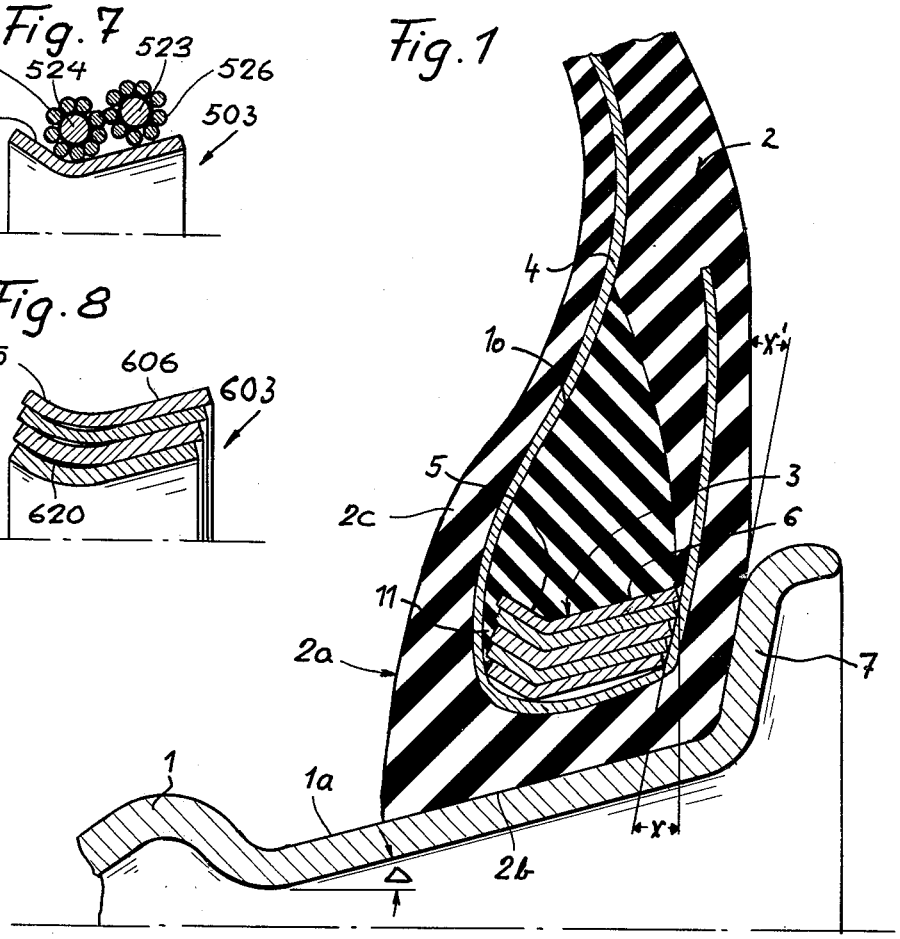
FIG. 1 is a transverse section through a tire-bead structure and felly illustrating the principles of the invention.

The wheel for a truck or other heavy duty motor vehicle comprises a steep-shoulder felly 1 whose bed 1a is inclined to the axis of the wheel at an angle Δ of about 15° and accommodates a tubeless tire whose bead structure and side wall structure have been illustrated although the tread and the tread-carrying carcass are not shown.

The bead 2a has an inner edge 2b which lies along the felly bed 1a and thus includes the angle Δ with the horizontal. The bead 2a contains a core 3 which is embedded in the rubber 2c of the tire. Steel-cord carcass reinforcement 4, preferably in the form of belts, is looped around the bead core 3.

Figure 10:
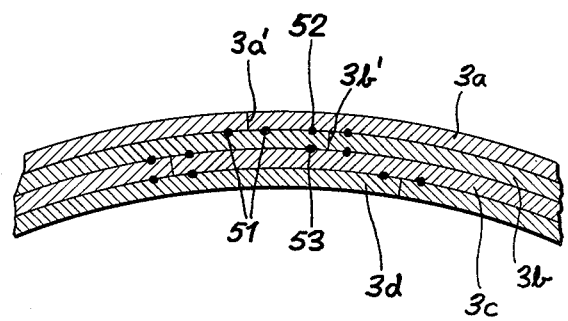
FIG. 10 is a cross-sectional view taken in an axial plane illustrating an element of the invention.

The bead core 3 is composed of a plurality of coaxial layers of strip steel whose non-overlapping ends are welded by spot welds to the next upper and lower layer as shown in FIG. 10. Thus the ends 3a' of the upper layer 3a are spot welded at 51 to the next lower layer 3b which, in turn, is spot welded to both adjoining layers at 52 and 53. The layers 3c and 3d are spot welded similarly.

Figure 2:
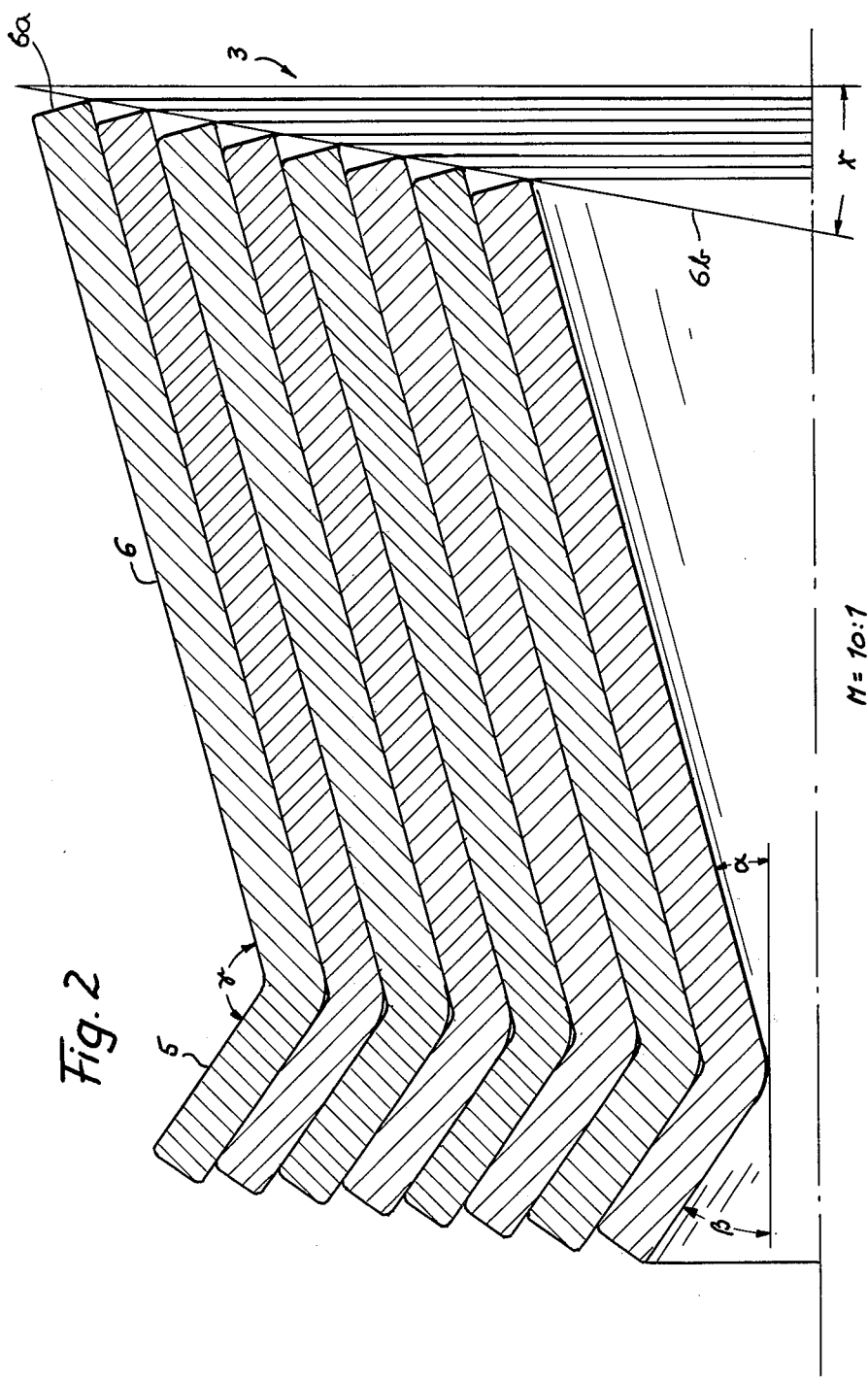
FIG. 2 is a section through the strip-steel bead core of FIG. 1, drawn to a larger scale.

The strip steel has a generally L-shaped profile forming an obtuse angle γ between the foot 5 and the shank 6 (see FIG. 2).

The shanks 6 include angles α with the axis of the wheel and with a horizontal, the angle α being about 15° and preferably being equal to the angle Δ. The strip thickness is about 1 mm and prior to bending to form the profile of FIG. 2, has a width of 20 mm.

The base angle β is about 35° which causes the outer edges 6a to be staggered and lie along a surface 6b forming an angle x with the vertical which can correspond to the angle x included between the flange 7 or felly 1 with the vertical.

By adjustment of the angle β while α is maintained constant, the angle x can be set as desired.

FIG. 3 shows an embodiment which differs from that of FIG. 1 in which the junction between the legs 105 and the shanks 106 of the layers of the core ring 103 is rounded as shown at 120 while the axially outer edges 106a are bent in the same direction as the legs 105. This increases the concavities of each inner layer in which each outer layer is nested.

In the embodiment of FIG. 4, the core ring 203 receives an outwardly rounded rubber filler 208 in its outermost concavity, the filler 208 being vulcanized to the outer strip 203a.

The core ring 303 of FIG. 5 can consist of one or more profiled layers as described, or only the single layer 303a, but receives another bead member 309 which includes an inner steel strip 309a of flat oval cross section, surrounded by layers of steel cord or wire as shown at 309b. The member 309 can be impregnated with rubber or an adhesive and is held in the concavity 321 of the ring 303 solely by its shape. FIG. 6 shows an arrangement in which the multilayer ring 403 is coated with a rubber-bonding adhesive 422 which improves the bonding of the ring in the bead of the tire.

The core ring 503 of FIG. 7 has a concavity 521 receiving a pair of circular cross section cores 523 and 524 each wound with steel wire layers at 526 and 527.

The assembly of FIG. 7 may also be encased in adhesive or rubber.

A J-section shape of the layers of the core 603 has been shown in FIG. 8 in which the junction 620 between the legs 605 and the shanks 606 is shallowly rounded.

Figure 9:
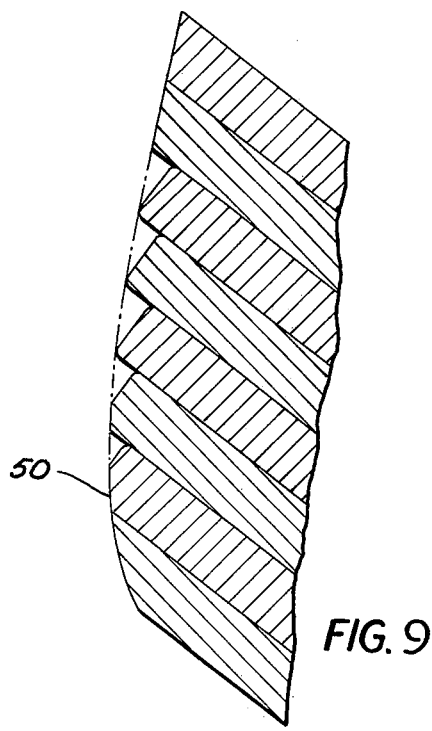
FIG. 9 is a fragmentary view similar to FIG. 2 illustrating a feature of the invention.

The ring formed by the layers, as can be seen in FIG. 1, can be associated with a body 10 of generally triangular section and composed of rubber with a lip 11 lying between the belts 4 and legs 5 and thereby forming a rounded guide surface for the belts. Naturally, these edges of the ring can be rounded by grinding or other material-removal techniques as has been shown at 50 in FIG. 9. The outer edges of the ring can also be rounded in a similar manner.

We claim:

1. In a tubeless tire for a steep-shoulder felly for truck and heavy duty wheels, in which the felly has a felly bed inclined at an angle of about 15° to the wheel axis, said tire having beads received in said felly and provided with bead cores comprising steel strip embedded in rubber along the bead, the improvement wherein at least one of said bead cores comprises a plurality of nested annular layers of steel strip, each of said layers of steel strip being bent into a generally L-shaped profile having an outwardly open concavity defined between an axially inner relatively short foot and an axially outer relatively long shank, said foot and shank of each layer of steel strip including an obtuse angle between them.

2. The improvement defined in claim 1 wherein the ratio of the length of the foot to the length of the shank of each layer of steel strip is substantially 1:4.

3. The improvement defined in claim 1 wherein each leg and shank of a respective layer of said steel strip are interconnected at a rounded bend.

4. The improvement defined in claim 1 wherein each foot and shank of each layer of steel strip include an obtuse angle between 120° and 135° between them.

5. The improvement defined in claim 1 wherein said steel strip is of a thickness of about 1 mm and said layers are cut from a coil of strip steel having a width of about 20 mm.

6. The improvement defined in claim 1 wherein said layers of steel strip form a stack and said stack is coated with an adhesive.

7. The improvement defined in claim 1 wherein an annular steel member is received in the concavity of the outermost layer of a stack of said layers of steel strip.

8. The improvement defined in claim 1, further comprising a body of rubber received in the concavity of the outermost layer of a stack of said layers of said steel strip, said body of rubber having a lip reaching along edges of said feet.

* * * * *